(12) United States Patent
Guidetti

(10) Patent No.: US 6,896,474 B2
(45) Date of Patent: May 24, 2005

(54) PROCESS AND DEVICE FOR CONVEYING PRODUCTS, FOR INSTANCE FOR AUTOMATIC PACKAGING INSTALLATIONS

(75) Inventor: Dario Guidetti, Grignasco (IT)

(73) Assignee: Cavanna SpA, Prato Sesia Novara (IT)

( * ) Notice: Subject to any disclaimer, the term of this patent is extended or adjusted under 35 U.S.C. 154(b) by 96 days.

(21) Appl. No.: 10/004,903

(22) Filed: Nov. 2, 2001

(65) Prior Publication Data

US 2002/0050125 A1 May 2, 2002

(30) Foreign Application Priority Data

Nov. 2, 2000 (EP) ............................................ 00830728

(51) Int. Cl.$^7$ .............................................. B65G 57/28
(52) U.S. Cl. .............................. 414/789.2; 198/370.08; 198/452
(58) Field of Search ........................ 53/543; 198/419.1, 198/370.08, 419.3, 426, 430, 452; 414/789.2

(56) References Cited

U.S. PATENT DOCUMENTS

| | | | | |
|---|---|---|---|---|
| 2,905,341 A | * | 9/1959 | Anderson ................ | 414/789.2 |
| 4,564,104 A | * | 1/1986 | Anderson ................ | 198/419.2 |
| 5,035,315 A | * | 7/1991 | Fukusaki et al. ........ | 198/419.2 |
| 5,893,701 A | * | 4/1999 | Pruett ..................... | 414/798.2 |
| 6,125,990 A | * | 10/2000 | Rupert et al. ............ | 198/419.3 |
| 6,158,570 A | * | 12/2000 | Strasser et al. .......... | 198/419.2 |

FOREIGN PATENT DOCUMENTS

| | | |
|---|---|---|
| DE | 200 03 754 U1 | 6/2000 |
| GB | 1152333 | 5/1969 |

* cited by examiner

Primary Examiner—Janice L. Krizek
(74) Attorney, Agent, or Firm—Dorsey & Whitney LLP

(57) ABSTRACT

Associated to the first product of each group or slug of products being formed is a first engagement element which follows the movement of advance of said first product, preventing it from falling forwards in the direction of advance. In such conditions, the products are made to advance according to a stacking path that is substantially horizontal, setting them up against the first product, and thus determining the formation of groups or slugs of products and counting the number of products stacked. When the number of products stacked reaches the desired value, the last product in the group is engaged by a second engagement element which exerts an action of thrust in a forward direction on the slug of products thus formed, so causing separation thereof from the first product of a new slug being formed in the stacking structure.

The stacking operation is performed on the products, which are set on edge after being tipped starting from a previous substantially horizontal position of advance. Preferably, the first retention element and the second retention element are inserted in the flow of the products in a position corresponding to the region in which the aforesaid movement of tipping the products into the on-edge position is performed.

A preferential application is for plants for automatic packaging of products, such as foodstuffs.

32 Claims, 5 Drawing Sheets

Fig_2

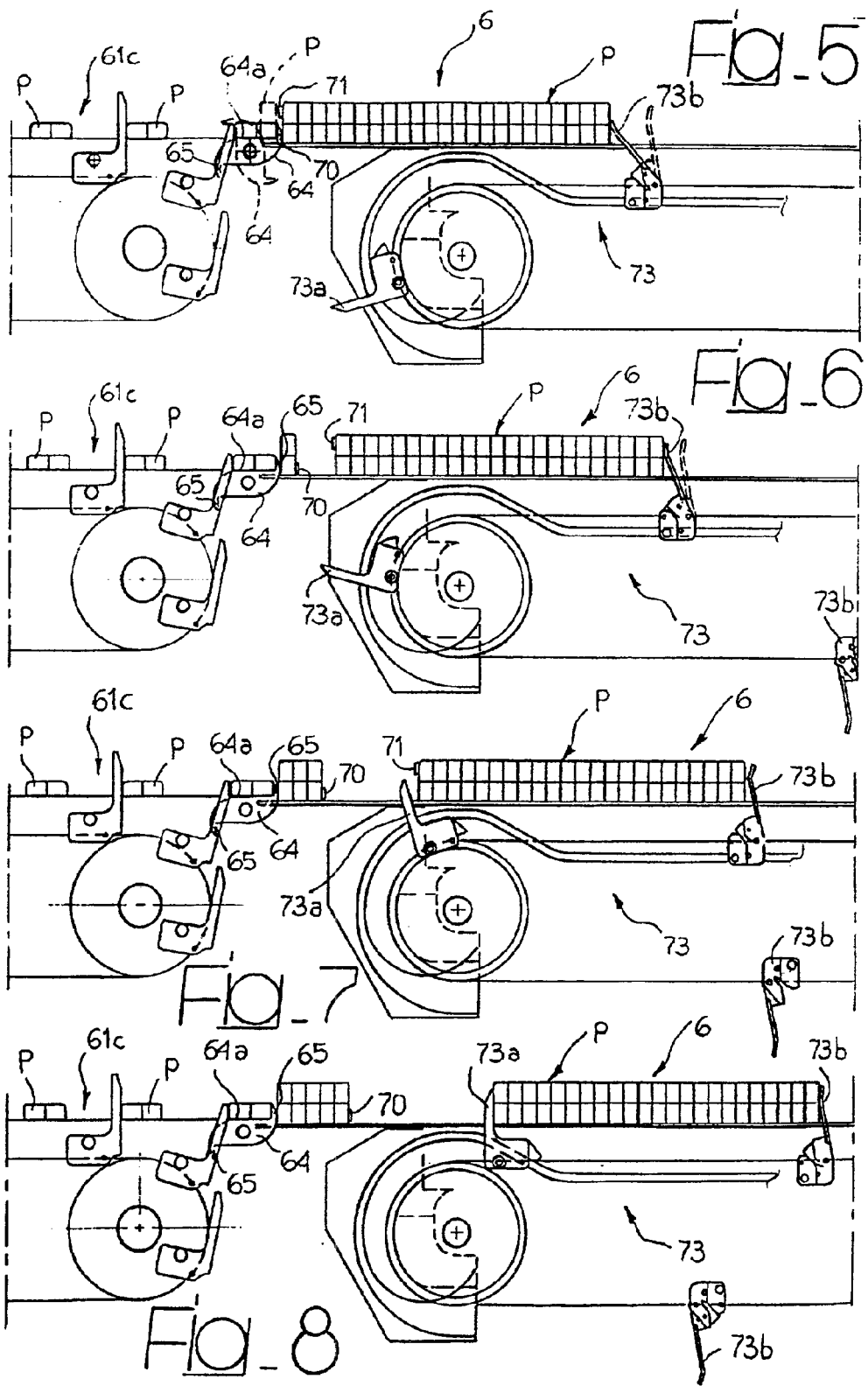

PROCESS AND DEVICE FOR CONVEYING PRODUCTS, FOR INSTANCE FOR AUTOMATIC PACKAGING INSTALLATIONS

CROSS-REFERENCE TO RELATED APPLICATION

This Application claims priority to European Patent Application No. 00830728.2, filed 2 Nov. 2000 (EP 00830728.2). EP 00830728.2 is hereby incorporated by reference as though fully set forth herein.

The present invention relates to systems for conveying products and may be applied, for example, in plants for automatic packaging of products, such as foodstuffs.

The invention has been developed with particular attention paid to its possible applications in plants used for packaging cream-filled biscuits that are to form blocks (or "slugs") containing a certain number of products (for example, in the region of fifteen or more), which, at least from a certain point onwards are piled up and made to advance set "on edge", i.e., with their plane of extension oriented in the vertical direction. Usually these are products that are rather delicate (at least in the phases immediately following upon filling on account of the possible presence of a filling paste or cream that is still soft) and rather thick (hence, with quite a large weight and quite a high individual calories content).

All the above conditions lead to ruling out the possibility of carrying out rough handling operations that are likely to cause the filling to come out and/or relative sliding of the two parts of the biscuit between which the filling is comprised.

What has been said above also applies to possible operations linked to the integration of items of product missing in the flow of the products that are being handled.

In the plants in question, in fact, there may arise, in the flow of products being fed along the line, discontinuities linked to the occurrence of different phenomena, such as the at least momentary interruption of operation of one handling station, the elimination of one or more products considered to be defective, etc.

Various solutions have been proposed to tackle these problems, such as the insertion—including dynamic insertion—of reserve products in the positions corresponding to the discontinuities, the formation of areas of accumulation where the flow of products may be re-compacted, so eliminating the discontinuities, and the discarding of the final package in which the product or products corresponding to the discontinuity are missing, etc.

The above solutions, to a greater or lesser extent, present intrinsic drawbacks linked to the complexity and difficulty of implementation, the possible reduction in the rate of operation of the plant, and the consequent reduction in its production efficiency. These are drawbacks which become of increasing importance with the trend towards building conveying plants designed to operate on an ever-increasing number of products in unit time, it not being, on the other hand, tolerable (for obvious reasons) either that there should be a number of products different from the expected one in the final package or that an entire block which comprises a number of products other than the desired one should be completely discarded.

The object of the present invention is to provide a solution that is able to overcome the drawbacks outlined above.

In accordance with the present invention, the above object is achieved thanks to a process having the characteristics specifically referred to in the annexed claims. The invention also regards the corresponding device.

Basically, in one first aspect, the invention aims at achieving grouping (i.e., stacking) of the products according to criteria that will eliminate the risk of possible damage/alteration of the products; this also in the case of somewhat delicate products, such as biscuits that have just been filled with cream, where the filling is still rather soft.

The invention also aims at providing a conveying system operating in such a way as to minimize—and in fact eliminate—the negative effects deriving from possible discontinuities that may be encountered in the flow or flows of incoming products.

The invention will now be described, purely by way of non-limiting example, with reference to the attached drawings, in which:

FIGS. 5–8 illustrate, in an ideal sequence, the criteria of operation of various elements illustrated in FIG. 4.

Figure 1:
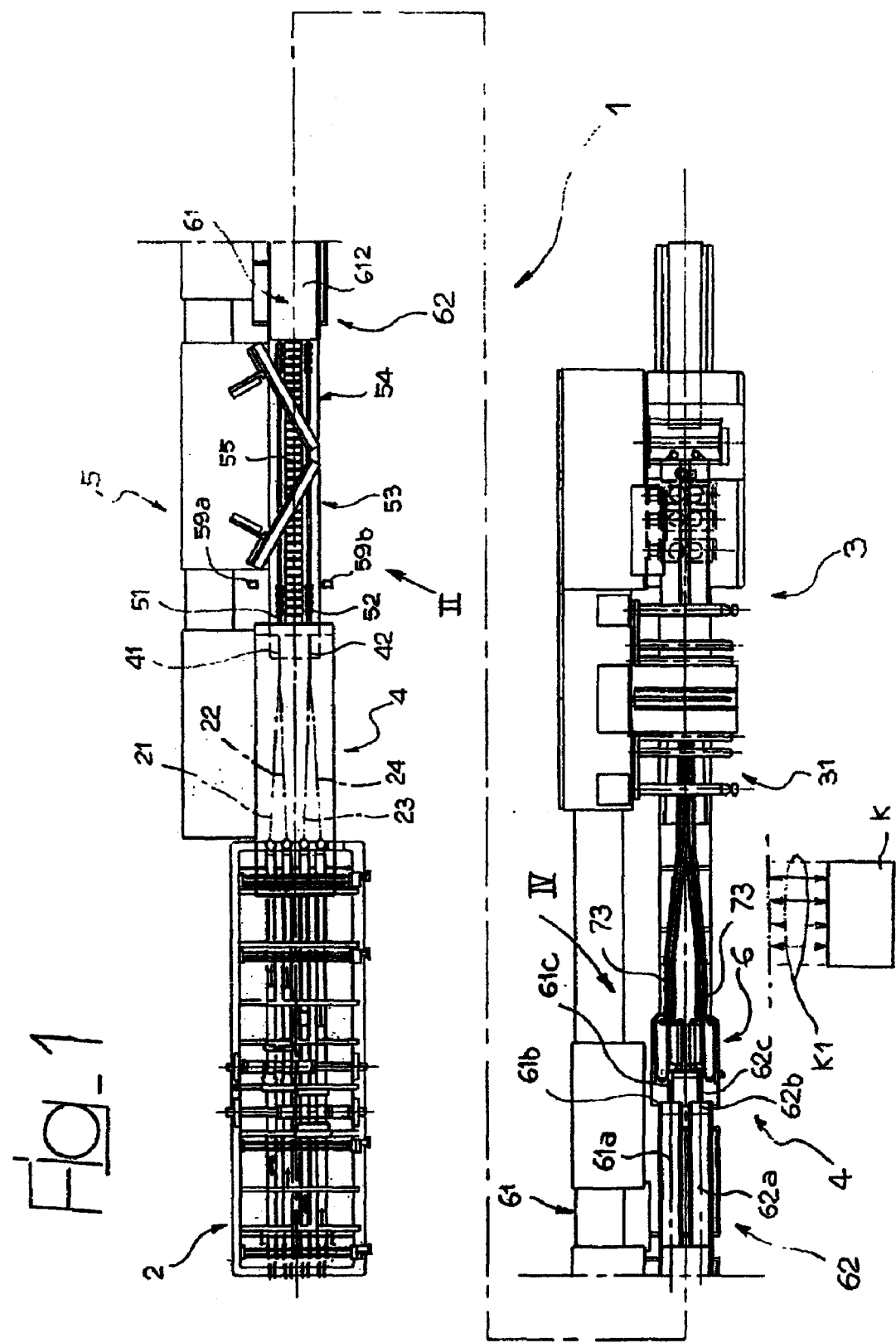
FIG. 1 is an overall top view of a portion of an automatic packaging plant incorporating the solution according to the invention.

In FIG. 1, the reference number 1 designates, as a whole, a portion of an automatic plant for conveying (and stacking) products P. In the example of embodiment herein illustrated—which is purely a non-limiting example—the products in question are represented by foodstuffs, such as cream-filled biscuits.

In particular, the portion of plant 1 here illustrated is comprised between a filling machine 2 (represented schematically at the top left in FIG. 1) and a packaging machine 3 (also represented schematically, at the bottom right in the same FIG. 1).

Both the filling machine 2 and the packaging machine 3 correspond to solutions altogether known to the prior art. As such, these machines do not require any detailed description herein, also because their characteristics are not in themselves important for the purposes of understanding and implementing the present invention.

As regards the filling machine 2, it will here suffice to recall that it may, for example, consist of a machine designed to supply at output (on four conveyors indicated by the reference numbers 21–24) cream-filled biscuits P, each made up of two wafers or biscuits joined together with a cream filling set in between. The products in question are represented explicitly only in FIGS. 2–8.

The conveyors 21–24, set at output from the filling machine 2, may, for example, consist of motor-driven chain conveyors designed to act on the products P by means of drawing formations made up of teeth or prongs.

For reasons that will emerge more clearly in what follows, the conveyors in question are configured in such a way that:

adjacent conveyors extend in pairs (namely, in the example illustrated, the conveyors 21 and 22 on the one hand, and the conveyors 23 and 24 on the other) according to trajectories which converge in the direction of feed of the products P (from left to right in FIG. 1); and the products P that are advancing on adjacent and converging conveyors are staggered with respect to one another, as they advance, by an interval at least equal to the length (measured from the direction of feed) of the complex formed by the individual product P and the corresponding drawing formation (tooth) of the corresponding conveyor 21–24. This result can be obtained in a way of itself known by correspondingly regulating the positioning of the drawing teeth on the links of the respective chains.

The net result achievable is that of causing the products P that advance initially on the four conveyors 21–24 to flow into two parallel flows which advance on two further conveyors, designated by 41 and 42, which are described in greater detail in what follows.

For different reasons (for instance, momentary shortage of wafers or biscuits at input to the filling machine 2, rejection of filled products or of components to be filled that are considered defective, failure of supply of filling in one of the filling-pouring stations of machine 2, etc.), on the conveyors 21–24 there may arise phenomena of momentary lack of one or more products corresponding to discontinuities in the respective flows.

In certain operating conditions (for example, when the aim is to operate the plant at reduced capacity), the above-mentioned discontinuity may also correspond to the complete lack of one of the outcoming flows of products P. For instance, the section of the filling machine 2 designed to feed the conveyor 24 may be kept deactivated so that, at output from the machine, there are only present three flows of products P which advance on the conveyors 21, 22 and 23. Of course, the fact that here reference is made to the conveyor 24 (and the corresponding section of the machine 2) is purely to provide an example: what has been said previously may in fact be applied indifferently to any one of the conveyors 21–24.

With reference now to the output end of the plant 1, the machine 3 may, for instance, consist of a normal packaging machine of the type currently referred to as "flow pack". As has already been said, the characteristics of such a machine must be considered altogether known, and hence such as not to require a detailed description herein.

In the specific embodiment illustrated, which is provided purely as an example, the machine 3 is designed to operate on blocks (or slugs) comprising a certain number of products P (this number is twenty-three in the example illustrated in FIGS. 5–8) stacked and made to advance on edge, consequently oriented in the vertical direction and set one up against the other. The slugs of products P are fed towards the machine 3 by a respective input conveyor 31, which may, for example, consist of a motor-driven chain conveyor designed to carry along the slugs of products P. Preferably, the conveyor 31 acts on each slug by means of a pusher element or tooth designed to act up against the product P that occupies the tail position in each slug (according to the direction of advance of the slug) and by means of a head tooth which rests (usually under the pre-loading imparted on it by a spring) on the product P located in the leading position of the slug. The purpose of this is to ensure regular feed of the slug of products, preventing the said products P, in particular the ones located towards the front in the slug, from falling accidentally forwards. According to known criteria, the teeth of the conveyor 31 are designed to disappear beneath the plane of drawing of the respective conveyor once the slug of products P has definitely been inserted in the tubular wrapper that is formed continuously (according to altogether known criteria) inside the packaging machine 3.

Both the filling machine 2 and the packaging machine 3, as well as all the other motor-driven elements of the plant to which reference will be made in what follows, move, being driven by and under the control of a processing unit K which monitors automatic operation of the plant. This processing unit may advantageously consist, for example, of a programmable logic controller (PLC) or an equivalent processing unit (for instance, a PC).

The connecting lines between the unit K and the various devices included in the plant 1 are designated collectively by the reference K1.

The function of conveying the products P between the filling machine 2 and the packaging machine 3 is ensured by various devices operating in cascaded fashion.

A first device, designated by 4 and located downstream of the filling machine 2, basically comprises the conveyors already described previously, i.e., the four conveyors 21–24 together with the two conveyors 41 and 42 towards which the flows of products coming from the conveyors 21 and 22, on the one hand, and from the conveyors 23 and 24, on the other, respectively converge.

The distinction between the conveyors 21–24 and the conveyors 41 and 42 has been made mainly for reasons of simplicity of illustration. In actual fact, the conveyor designated by 41 (and, respectively, the conveyor designated by 42) may simply correspond to the stretches downstream of the conveyors 21 and 22 (and, respectively, of the conveyors 23 and 24).

As has already been said, the conveyors 21 and 22 on one hand, and the conveyors 23 and 24 on the other are initially set apart from one another at output from the filling machine 2, then to approach one another gradually as the products P are fed through the device 4.

The purpose of this is to promote, precisely on account of the staggering of the flows present on the conveyors 21 and 22, on the one hand, and 23 and 24, on the other, merging of the two pairs of flows of products P coming out of the filling machine 2 into two flows, each of which deriving from the confluence of two flows.

This result may be obtained (also in this case in a way of itself known) by seeing to it that the drawing formations or teeth of the various conveyors 21–24 are not mounted in a longitudinally centred position with respect to the respective motor-drive chains, but protrude instead laterally, in particular with the teeth of the conveyor 21 projecting in the direction of the conveyor 22 and, in a symmetrical way, with the teeth of the conveyor 22 projecting in the direction of the conveyor 21.

Likewise, the teeth of the conveyor 23 project in the direction of the conveyor 24 and, in a symmetrical way, the teeth of the conveyor 24 project in the direction of the conveyor 23.

By mounting the motor-driven chains of the conveyors 21–24 in such a way that the motor-driven chains of the conveyors 21 and 22, on the one hand, and the motor-driven chains of the conveyors 23 and 24, on the other, converge, the respective teeth (as well as the products P pushed by them) end up by interpenetrating or interlacing (without interference, given the staggering referred to previously) so as to give rise to a first flow of products and a second flow of products on the conveyors 41 and 42 respectively, at output from the device 4.

It will moreover be appreciated that, on the basis of the criteria, which are altogether evident for a person skilled in the sector, the aforementioned mechanism for merging two flows into a single flow may be adopted, with corresponding variations (in particular as regards the longitudinal staggering of the incoming flows) to achieve merging of three or more flows of incoming products into a single flow.

The conveyors 41 and 42, which make up the conveyors at output from the device 4, constitute (or feed, by means of an alternating mechanism between a number of conveyors cascaded together, which is evident for a person skilled in the sector) the input conveyors 51, 52 for input into a further device 5 designed to perform a function of rendering the flows of products P that appear on the conveyors 41 and 42 uniform.

The two conveyors 51 and 52, which are set alongside one another, receive the products of the conveyors 41 and 42 to send them on through two transfer units or stations 53 and 54.

In particular, the unit 53 is able to act on the products that advance on the conveyor 51 to transfer them onto the conveyor 52. In a symmetrical way, the unit 54 is able to transfer the products that advance on the conveyor 52 to transfer them onto the conveyor 51.

In the exemplary embodiment herein illustrated, the transfer unit 53 is represented as being located upstream of the unit 54. It is, however, evident that the order of alternation of the units in question could be reversed.

The units 53 and 54 act in a coordinated way with a further motor-driven conveyor, designated by the reference number 55, located in a position between the conveyors 51 and 52 with the capability of moving in a synchronized way (i.e., in the absence of relative motion) with the conveyors 51 and 52 themselves.

According to a variant embodiment not illustrated herein, the conveyor 55 may be made up of extensions of the drawing formations (teeth) of the conveyors 51 and 52 extending inside the area comprised between the conveyors 51 and 52. In yet another possible variant embodiment, the conveyors 51, 52 and 55 may be merged into a single conveyor having characteristics corresponding to those of the conveyor 55 illustrated in the attached drawings.

In practice, the conveyor 55 in question has a structure that substantially resembles that of a track, the shoes of which, designated by 56 (FIG. 2) have an overall channel-like configuration comprising:

- a bottom surface 56a extending, in the form of an ideal connection of the areas in which the conveyors 51 and 52 act, transversely with respect to the direction of drawing of the conveyors 51 and 52 themselves; and
- sides or walls 56b extending in at least substantial alignment with the teeth of the conveyors 51 and 52.

In the currently preferred embodiment, each unit 53, 54 simply consists of a conveying structure that is substantially similar to that of the various conveyors so far described. The said structure therefore comprises a motor-driven chain 53a, 54a bearing at least one element substantially resembling a tooth, designated by 53b, 54b. The said element is able to act on the products P thanks to the general oblique arrangement of the respective chain 53a, 54a with respect to the directions of advance of the products P on the conveyors 51 and 52.

Figure 2:
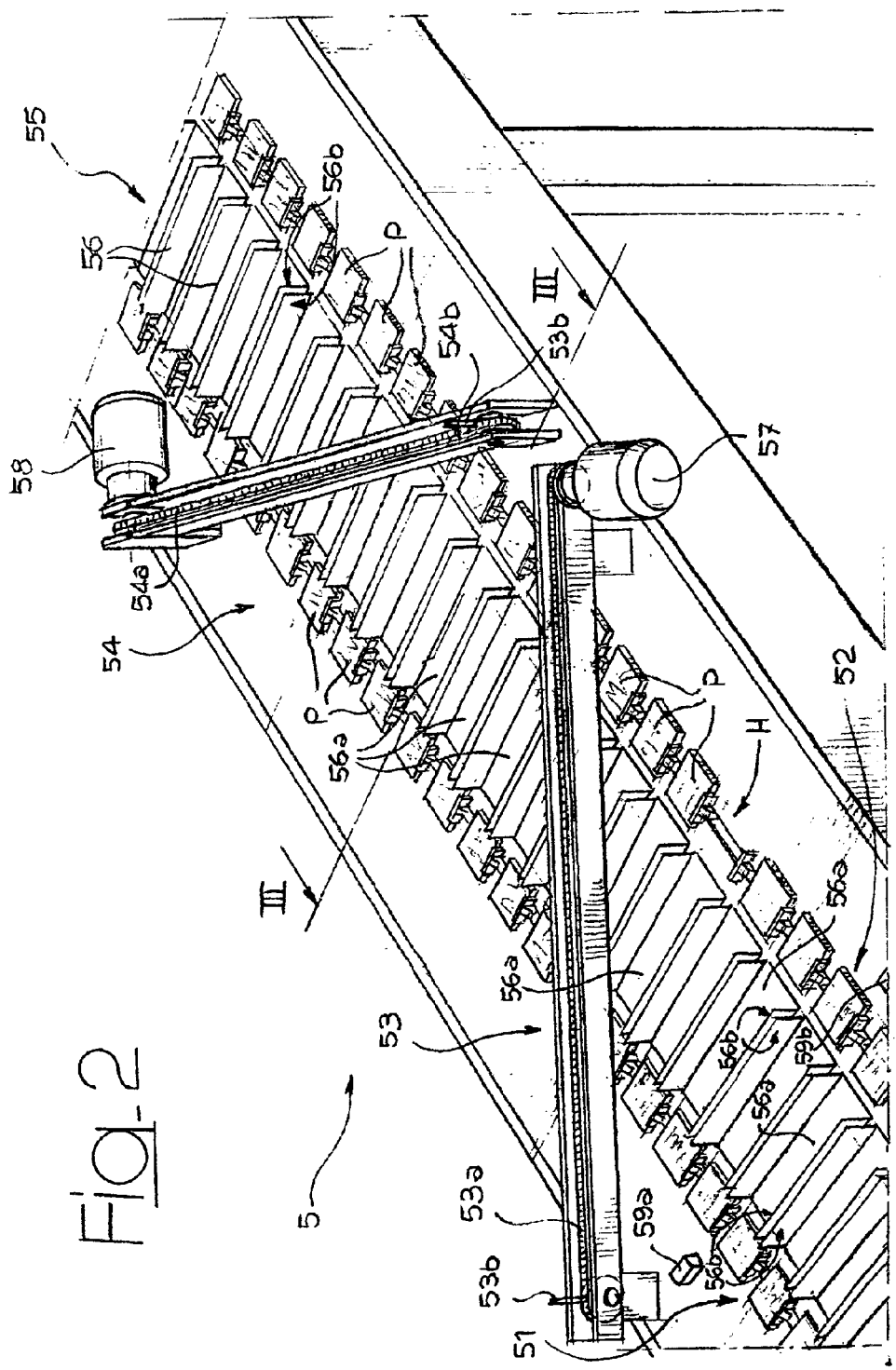
FIG. 2 is an overall perspective view, reproduced at an enlarged scale, of the part of FIG. 1 indicated by the arrow II.
Figure 3:
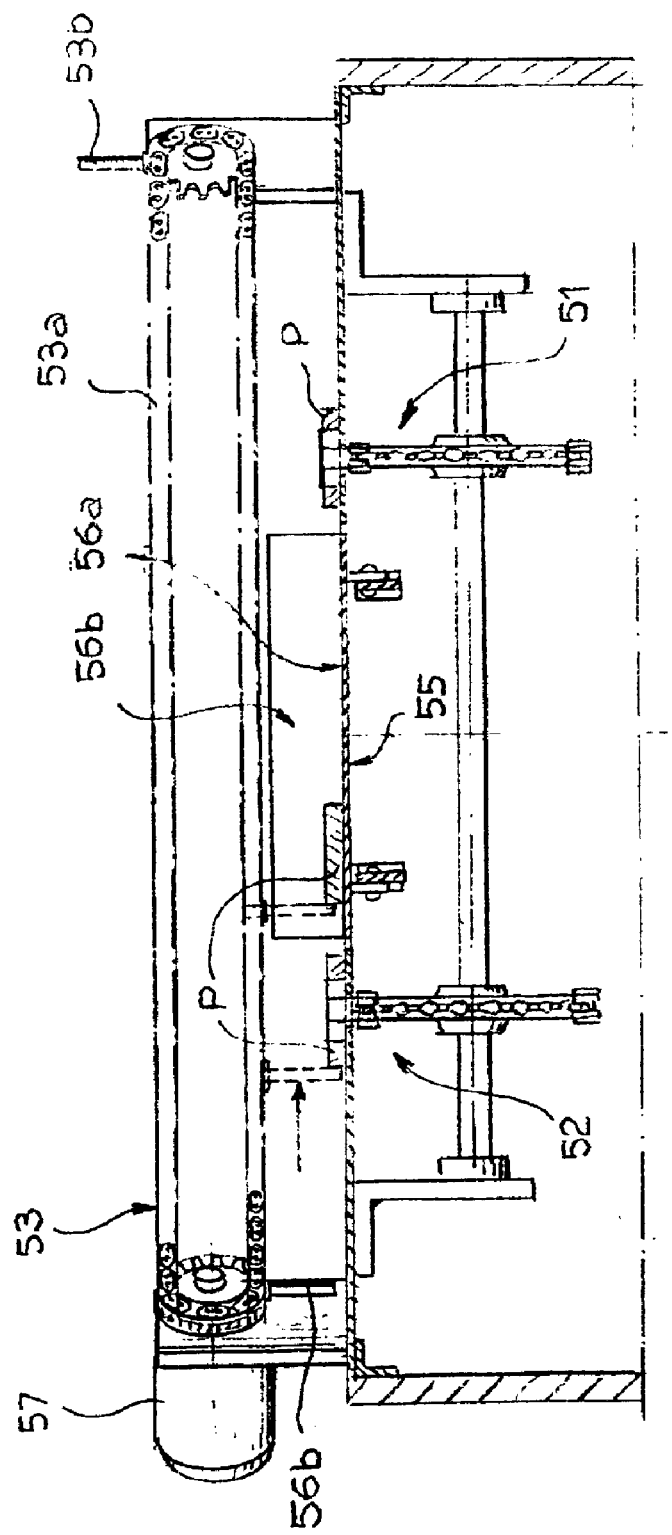
FIG. 3 is a cross-sectional view according to the line III—III of FIG. 2.
Figure 4:
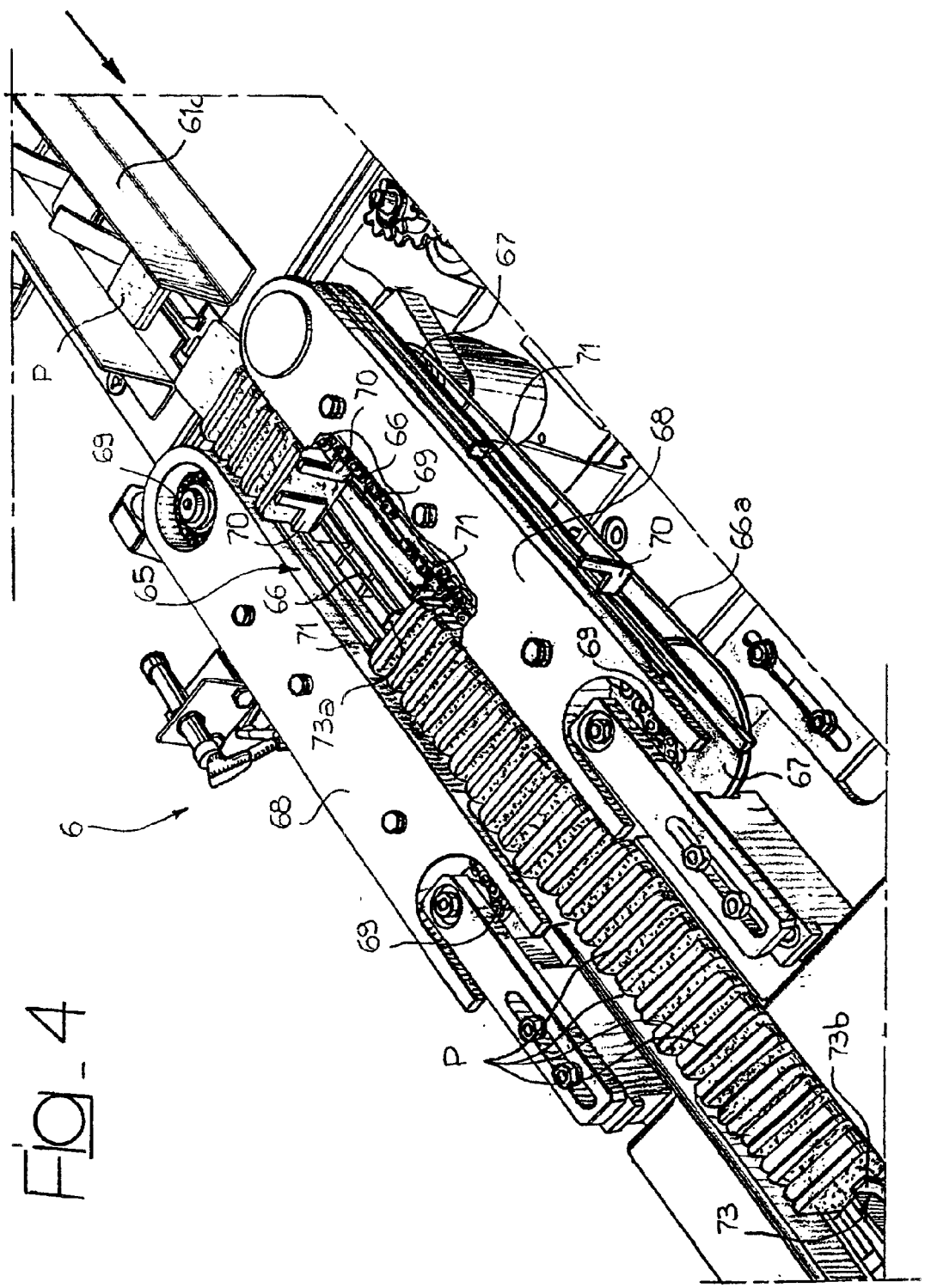
FIG. 4 is an overall perspective view, also reproduced at an enlarged scale, of the part of FIG. 1 indicated by the arrow IV.

In particular, in the unit 53, the chain 53a is arranged with its end upstream (with reference, of course to the direction of advance of the products P, which is from left to right in FIGS. 1, 2 and 4) located in a position corresponding to the conveyor 51 and its end downstream located in a position corresponding to the conveyor 52. In a symmetrical way, in the unit 54, the chain 54a is arranged with its end upstream located in a position corresponding to the conveyor 52, whereas the end downstream of the same chain 54a is located in a position corresponding to the conveyor 51.

Consequently, the active element or elements 53b of the chain 53 are able to intervene on the products P that are advancing on the conveyor 51 by acting laterally on the said products starting from their sides that remain outwards with respect to the device 5. The purpose of this is to displace the products P on a respective shoe 56 of the conveyor 55, causing them to slide gradually towards the conveyor 52, so as to transfer them onto the conveyor 52 itself.

In a symmetrical way, the active element or elements 54b of the unit 54 are able to intervene on the products P that are advancing on the conveyor 52 by acting laterally on the said products starting from their sides that remain outwards with respect to the device 5. The purpose of this is to displace the products P on a respective shoe 56 of the conveyor 55, causing them to slide along the shoe 56 until they are transferred onto the conveyor 51.

Movement of the chains 53a and 54a of the units 53 and 54 is controlled by respective motors 57, 58, the operation of which is controlled selectively by the unit K according to the criteria that will be described in greater detail in what follows.

According to an arrangement substantially similar to the one adopted for transferring the products P between the device 4 and the device 5, the conveyors 51 and 52 are able to function as feed conveyors for a further device 6 (FIG. 4) in which the products P included in the two flows coming out of the device 5 are subjected to tipping and stacking so as to be grouped together into respective blocks or slugs, each comprising a given number n (for example, n=23) of products P.

The tipping action is rendered necessary in so far as, in the example of embodiment here illustrated, the products P come out of the filling machine 2 laid out flat, this orientation being conserved during advance through the devices 4 and 5.

Preferably, provided downstream of the conveyors 51 and 52 and upstream of the stacking station proper, in the device 6 are additional conveyors, collectively designated by 61 and 62. These conveyors are, more precisely, with reference to each of the two conveying paths of the products, the following:

- a belt conveyor 612 (preferably common to the two paths and/or driven by a common motor-powered drive), which receives the flows of products P arriving on the conveyors 51 and 52 to perform the function of "storage unit" so as to be able to absorb, by means of a slight variation of the speed of drawing imparted on the products P, the phenomena of discontinuity linked to possible shortages of products in the input flows; preferably, the conveyor 612 carries, associated to it, a counting system of a purely kinematic type for counting the products as they advance, the said counting system being without the use of optical sensors, such as photocells or the like, in order to render the aforesaid synchronization action altogether insensitive to the possible presence of deposits of cream, crumbs, etc.;
- a further conveyor 61a, 62a having, respectively, the functions of dispenser and timer, usually with a control that is independent for the two paths, and being designed to start their operation of phasing of the products P in view of the latter's entry into the device 6;
- a timing conveyor 61b, 62b, usually having an independent control for each path and having a length that is adequate for controlling a single product at a time and/or being equipped with vacuum-operated (suction) means for exact retention of the products; and an inserter conveyor 61c, 62c, which is usually interlocked to the device 6 and which is also configured to carry out an action of positive drawing-along of the products P, for example as the result of the presence of respective pusher teeth.

Proper operation of the stacking device 6 is ensured owing to the performance, by the device 5, of an action of compensation carried out according to the criteria that will be described below.

The unit K detects (via sensors, for example of an optical or mechanical type) the presence of possible discontinuities (see, for instance, the empty position indicated by H in FIG. 2) in the flows of incoming products on the conveyor 51 or 52. These sensors are designated by the reference numbers 59a, 59b and are represented as being physically located at the input end of the device 5. It is evident that the same function could be performed also if the sensors were located elsewhere, for example at output from the device 4.

Basically, the unit K handles the data regarding the presence of the products supplied by the sensors 59a, 59b as cumulative counts of the products travelling and corresponding to the two flows fed onto the conveyors 51 and 52.

As long as the above-mentioned counts are identical to each other, or they indicate that one of the flows contains one product fewer than the other flow (or else, that the latter other flow contains one product more, which amounts to the same thing), there is no intervention on the part of the device 5.

As soon as an imbalance greater than unity is detected between the two flows in question (the choice of this threshold value is considered at the moment preferential, even though it is not in itself absolutely imperative), i.e., as soon as one of the two flows is found to have two articles fewer than does the other flow, the control unit K intervenes (according to the situation) on the unit 53 or else on the unit 54 in such a way as to transfer one product P from the flow that has more to the flow that has less.

In this way, a situation of balance is restored given that, by transferring a product from the flow that had more (i.e., that was found to have two products more than the other) to the flow that had less (i.e., that was found to have two products fewer), the two flows now return to a state of balance at an ideal shortage value of one product with respect to the ideal situation corresponding to the absence of discontinuities in the input flow.

The fact that, thanks to the intervention of the device 5, the two input flows to the device 6 are, so to speak, evened out with respect to the possible shortages means that any discontinuities at input to the device may be certainly offset through the storage-unit action provided in the context of the two conveyors 61 and 62.

The complex of the device 5 may be advantageously built and sized in such a way as to enable operation even in a very intense way (for example, to carry out as many as 400–500 interventions per minute). This means that it is possible even to handle the situation referred to previously where one of the input flows on one of the conveyors 21–24 is totally missing in so far as the corresponding section of the filling machine 2 is deactivated.

In the above case (supposing that the deficient input flow is that of the conveyor 24 and leaving, for reasons of simplicity, out of consideration the possible occasional shortages of products P), the flow of products arriving on the conveyor 51 (fed by two of the output conveyors from the machine 2, i.e., the conveyors 21 and 22) will normally comprise a number of products that is exactly twice the number of products in the incoming flow on the conveyor 52 (which is fed only by the conveyor 23 of the filling machine 2).

In this case, the device 5 (and in particular, the unit 53) will be called upon to intervene at time intervals corresponding to the arrival of four products on the conveyor 51 and of two products on the conveyor 52, the aim being to restore the situation of balance by transferring one product from the conveyor 51 to the conveyor 52.

Returning now to the description of the device 6, it will be noted that the said device 6 comprises, downstream of the various conveyors 61 and 62, two wheels having a sickle-shaped or star-shaped structure, these wheels being designated by 64.

The above wheels are not explicitly visible in FIG. 4, in so far as they are hidden by the products P, which the wheels 64 themselves tip up, causing them to change their orientation from lying flat down, a position which the products P maintain during advance of the filling machine 2 up to the end set downstream of the conveyors 61c, 62c, to an orientation in which they are set on edge, the said orientation being adopted to enable piling up of the products P.

The wheels 64 are instead clearly visible in the left-hand part of FIGS. 5 to 8. These figures illustrate (as does, moreover, FIG. 4) the structure and operation of one of the two units set alongside one another in the device 6 in the example of embodiment here illustrated.

In particular, of the said units set alongside one another, the one illustrated in FIG. 4 is designed to operate on the products P coming from the conveyor 61c (which is, in fact, visible at the top right of FIG. 4). An altogether similar unit is designed to operate on the products P that arrive on the conveyor 62c.

It should, however, be re-emphasized that the example illustrated is only one of the possible examples of embodiment of the invention. The device 6 may therefore comprise any number (virtually, from 1 to n) of units of the type illustrated in FIG. 4.

In particular, it will be appreciated that the possibilities of use of such a unit are altogether general, in the sense that the said unit is able to operate advantageously on a flow of articles set on edge in a way that is altogether independent of the nature of such articles (hence, without limitations of any sort to the possible application for cream-filled biscuits), and independent of whatever handling operations the products may have undergone previously.

In particular, the wheels 64 have sickle-shaped profiles with teeth or spokes (two in number) set diametrically opposed, in the exemplary embodiment illustrated, which, as has been said, is purely a non-limiting example, each tooth or spoke being provided with a front side 64a (according to the direction of rotation, which is clockwise, as seen in FIGS. 5–8).

The above-mentioned front side is able to set itself initially in approximately horizontal alignment with the plane of conveyance of the products P on the conveyor 61c, so that it will be able to change its orientation, as a result of the gradual rotation controlled by a respective motor power-drive (not explicitly illustrated in the drawings), into a vertical plane so as to set the products P standing up on edge, i.e., oriented in a vertical direction.

The function of the wheels 64 is therefore that of setting the products P in a plane orthogonal to the main axis of stacking, which extends in a horizontal direction, of a respective stacking cage 65.

Inside the cage 65 (one for each conveying line), the products P are gradually pushed up against one another to form, as a result of the gradual addition of the products P at the base of the pile, a block (slug) comprising a pre-determined number n of products (for example, in the drawings of FIGS. 5–8, n is equal to 23).

The said number n can be simply determined by an action of mechanical counting, for example according to the movement of rotation of the wheels 64 by counting how many times the front sides 64a of the wheels 64 have come to occupy in succession, starting from a given instant of time, a position corresponding to the output end of the conveyor 61c, i.e., corresponding to the base or feeding position of the stacking cage 65.

During the tipping movement described previously (illustrated schematically by a dashed line only in FIG. 5), dropping of the products P downwards is prevented by the presence, on each wheel 64, of a terminal detaining tooth 65. The tooth 65 is located at the ends of the front side 64a, which at the end of the tipping movement occupies a bottom position.

Any falling forwards, i.e., in the direction of advance, of the products P set on edge is prevented by the presence of engagement elements. The latter usually take the form of teeth operating according to criteria described in greater detail in what follows with reference to FIG. 4.

In order to ensure regular feeding of the products P during stacking within the cage 65, a mobile conveying surface is provided for conveying the products P. In the exemplary embodiment illustrated, the said mobile conveying surface consists of at least one conveyor element having a horizontal extension and direction of motion, the said conveyor acting in the bottom region of the cage 65.

In the currently preferred embodiment of the invention, two of the said elements are present, each of which consists of a motor-powered filiform element 66 having a respective active branch which extends at the bottom surface of the cage 65 and is movable in the direction of advance of the products P (i.e., with reference to FIG. 4, from right to left and top to bottom).

The filiform element 66 in question is typically a ribbon or belt of flexible material, such as a plastic material, which winds around end pulleys 67 so as to form an idler or return branch 66a.

The pulleys 67 may be either pulleys with a vertical axis (as in the example of embodiment here illustrated) or pulleys with a horizontal axis. If the latter solution is adopted (which is not illustrated here, but which may be considered preferential from certain standpoints), the return branch 66a comes to be located underneath the active branch which performs the action of conveying the products P.

It will be appreciated that supporting the products P in a position corresponding to the stacking cage 65 with a mobile structure having a filiform configuration (elements 66) makes it possible to minimize the resting surface of the products P, hence minimizing the possibilities of contamination of the items being conveyed by, for example, the filling of the products P.

The sides of the cage 65 consist of two conveying assemblies 68, each of which houses, within it, two carousel structures.

Each of the said carousel structures in turn comprises two motor-driven loop-type formations (typically a ribbon, a belt, or, in the currently preferred embodiment, a chain 69) set on top of one another. Each of the said loop formations 69 carries on its periphery a certain number of teeth designated by 70 and 71 according to whether they are mounted on the loop formation located in a bottom position or else on the loop formation located in the top position.

It will be appreciated that in the view presented in FIG. 1 only the chains 69 of the two structures located in the top position are visible.

Irrespective of their location, the two carousel structures set on top of one another situated inside each of the assemblies 68 are basically identical, each one presenting an active branch which is substantially co-extensive with the stacking cage 65.

In this way, the teeth 70 or 71, which in turn come to occupy a position corresponding to the said active branch, project towards the inside of the stacking cage 65 so as to be able to act on the products P that are found inside the said cage.

The above carousel structures set on top of one another differ, instead, at least in the preferred embodiment, in that they present a slightly different conformation as regards their respective teeth 70 and 71 and, in any case, in that they have different modes of actuation, which in general presuppose the presence of two, at least marginally distinct, motor-powered drives. The foregoing without, of course, prejudice to the fact that, given the general symmetrical configuration of the set of elements represented on either side of the stacking cage 65, the modes of operation of the teeth 70 that are on one side are identical and specular with respect to the modes of operation of the teeth 70 that are on the other side, the said considerations applying also to the teeth 71.

It should moreover be said that the description provided herein, with reference to the preferred exemplary embodiment of the invention, presupposes the presence of two assemblies 68 with their corresponding mutually symmetrical structures acting on the products P in a way that is likewise symmetrical.

The principle lying at the basis of the present invention may, however, be implemented even in the presence of any number whatsoever of said elements, hence also in the presence of a single element provided with the teeth 70 and of a single element provided with the teeth 71.

The function of the teeth 70 is essentially that of preventing the products P, which have just been set on edge as a result of the action of tipping performed by the wheels 64, from falling forwards.

For this reason, as may be better seen in the view of FIG. 4, the teeth 70 preferably have an L-shaped structure in which it is possible to distinguish:

a proximal portion that extends starting from the respective chain 69 towards the inside of the stacking cage 65 in a position corresponding to the bottom region of the said cage, consequently in the proximity of the filiform conveying elements 66; and a distal portion that extends vertically upwards so as to be able to co-operate also with the top region of the products P that advance standing on their edges.

In particular, the teeth 70 are designed to co-operate with the first product or "head" product of each block or slug, i.e., with the product that is in the leading position in the direction of advance of the products P (from left to right in FIGS. 5–8).

Instead, the teeth 71 are designed to co-operate with the last product or "tail" product of a slug that has just been formed so as to exert an action of thrust on the other products in the slug, an action which is designed to separate each slug that has been formed from the next slug being formed.

The slug just formed and pushed forwards, and hence separated from the next slug being formed, is then bound to be taken up by the teeth 73a, 73b of a respective conveyor 73 (one for each stacking cage of the device 6) designed to flow, together with the homologous conveyor serving the other stacking cage, into the conveyor 31 of FIG. 1.

The latter conveyor 31 may be simply represented by the end set downstream of the converging conveyors 73:

in the condition of being set alongside one another, in the case where in the machine 3 the aim is to proceed to the subsequent packaging of pairs of slugs set alongside one another, or in the interlacing condition (that is, according to the modalities described previously with reference to the conveyors 21 and 22, on the one hand, and 23 and 24, on the other) following upon obvious prior staggering in time of the operation of the two units comprised in the device 6, in the case where, in the machine 3, the aim is to proceed to packaging single slugs in succession.

In particular, FIG. 5 illustrates the situation of operation of the device 6 in which a slug comprising twenty-three products P set on edge has just been completed.

Once the control unit K has detected that the said pre-set counting value has been reached—which, as has been said, may take place by means of a sensor for detecting rotation (not illustrated), associated to the wheels 64—it activates the motor drives of all four chains 69 in such a way as to set two pairs of teeth 70 and 71 in a position between the last product P inserted in the slug that has just been formed and the product P which comes immediately after, having just been tipped by the wheels 64, as represented by the dashed line in FIG. 5. Evidently, this product P is the one that is destined to form the first product of the next slug.

As soon as the teeth 71 have inserted themselves behind the slug that has just been completed, they are made to advance rapidly (by means of a corresponding command sent from the unit K to the corresponding motor drives) in such a way as to push the slug that has just been formed forwards. From FIG. 5 it will be appreciated that the front end of the slug pushed forwards had up to this point been kept in a vertical position by another pair of teeth 70 located in a position downstream of the pair of teeth just brought into engagement with the product P that is tipped.

The effect of the thrusting motion in a forward direction brought about by the teeth 71 is that of bringing the front end of the slug which is being pushed into a condition of engagement with the tooth 73b of the respective conveyor 73 located in a central position with respect to the stacking cage 65.

The teeth of the conveyor 73, which is, for example, a conveyor with a motor-driven chain of a type altogether familiar, are ordered in pairs, each pair comprising a front tooth 73a and a rear tooth 73b.

The terms "rear" and "front" of course refer to the direction of advance of the active branch of the conveyor 73, from left to right as viewed in FIGS. 5–8.

The teeth 73a, 73b are designed to emerge inside the stacking cage 65 downstream of the region in which the wheels 64 act, exploiting the intervals of separation between successive slugs formed by controlling the thrusting motion of the teeth 71.

In practice, the tooth 73a of each pair emerges from beneath (see, in particular, the sequence of FIGS. 6 and 7) to come to act against the rear end of the slug that has just been formed so as to ensure that the latter is drawn on forwards. At the same time, the front end of the same slug is taken up, avoiding its tipping forwards, by the corresponding tooth 73b, which is a tooth having characteristics of elastic compliance (characteristics illustrated with the representation of the active part in two different positions).

The purpose of the above motion is to exert, on each slug, an action of containment which, albeit firm and precise, prevents any application on the products P of stresses that might be too violent.

With reference again to the sequence illustrated in FIGS. 5 and 6, it may be noted that, as soon as the front end of the slug that has just been formed is taken up by the front tooth 73b, the teeth 70 can in fact release the said front end. This result is obtained by intervening on the respective chain 69, the movement of which is accelerated via the unit K, also exploiting the fact that, at the end downstream of the respective chain 69, the teeth 70 move outwards, thus disengaging from the forward path of the products P in the stacking cage.

The distance separating the teeth 70 which succeed one another on each chain 69 is thus usually chosen in such a way as to be at least marginally greater than the length of the slugs that are being formed.

In this way it is possible, by controlling acceleration of the movement of the chains 69, to cause the tooth 70 that engaged the front end of a slug taken up by a tooth 73b to be disengaged with respect to the slug, by getting the next tooth 70 to advance into a position of engagement of the first product P included in the next slug being formed.

As may be better noted from the sequence illustrated in FIGS. 6, 7 and 8, the latter tooth is in turn designed to keep in a vertical position the product P that is situated in the leading position of the slug being formed following the advance of the products P of the slug being formed.

In particular, the action of stacking of the products in the cage 65 takes place precisely because the tooth 70 is made to advance (by means of the respective chain 69) at a speed at least marginally lower than the speed of advance applied to the products P by the elements 66. In practice, the piles of products P are formed in that the products P arriving are pushed up against the first product P of the slug which is withheld by the tooth 70. The said thrusting action is exerted in a gentle way, taking into account also the fact that, once piled up, the products P can, however, slide on the elements 66 without getting damaged.

The tooth 70 is then designed to disengage at the front end, i.e., from the leading product of the completed slug (sequence illustrated in FIGS. 5 and 6, namely at the top right of the said figures) when a tooth 73b enters into the action of containment of the front end of the slug.

In an exactly dual manner, the teeth 71 which perform the thrusting action on the slug that has just been formed so as to bring about its separation from the next slug (sequence illustrated in FIGS. 5 and 6) are disengaged from the slug itself (also in this case with a corresponding control movement, i.e., deceleration, of the respective power-driven chains) as soon as the rear end of the slug is taken up by the tooth 73a of the conveyor 73 (sequence illustrated in FIGS. 7 and 8).

In addition to the advantages explicitly referred to in the introductory part of the description, the solution according to the invention enables further advantages to be obtained that are linked to the possibility of making a direct connection between the filling machine 2 and the packaging machine 3, achieving in practice a single management of the plant 1 which may be likened to the management of a single machine. In addition to this, it is possible to carry out an action of control on the rejects of the filling machine 2 by acting directly on the individual lanes (conveyors 21–24) of the machine, so preventing the multiplication of the rejects thanks to the automatic balancing of the two feed lanes originating from the device 4 performed in the device 5. Further advantages are linked to the compactness of the plant as a whole, to the reduction in the number of photocells required for controlling the flows, and to the possibility of achieving conveyance of filled products throughout almost all the plant without there being any actions of pressure exerted on the products themselves.

Of course, without prejudice to the principle of the invention, the details of construction and the embodiments may be widely varied with respect to what is described and illustrated herein, without thereby departing from the scope of the present invention as defined in the attached claims. In particular, the mechanism for evening out the flows, as described with reference to the two flows of the products P present on the conveyors 51 and 52, may be performed also by operating on a different number of flows, for example 3 or even a higher number of flows.

Furthermore, it will be appreciated that the possibilities of use of the device 6 (here illustrated as a two-lane device, but capable of comprising any number of product-treatment lanes, from 1 to n) are in no way limited to the specific modalities of handling of the products P (evening out of flows, etc.) illustrated herein. The device 6 and the corresponding process of operation may therefore be implemented and employed as independent solutions with respect to the example of embodiment illustrated herein.

What is claimed is:

1. A process for forming, starting from a flow of products being fed forwards, groups or slugs of products comprising a given number of products set on edge, each slug comprising, in the direction of advance, a first product and a last product, said process comprising the operations of:

associating, to the first product of each group, at least one first engagement element which is able to withhold said first product, preventing it from falling forwards in the direction of advance;

causing said products to advance according to a substantially horizontal stacking path, bringing about the formation of said groups or slugs as a result of stacking of the products themselves up against said first product;

upon reaching, by said stacked products, said given number, associating, to the last product of the slug that has been formed, at least one second engagement element;

by means of said at least one second engagement element, exerting an action of thrust in the direction of advance so as to separate the slug of products thus formed from a new slug of products being formed along said stacking path;

ordering said products according to at least one first flow and at least one second flow;

monitoring the number of products included in said first flow and said second flow;

detecting the occurrence of situations of imbalance in which one of said flows is richer than the other by a given number of products; and intervening on said first flow and said second flow in the presence of said situations of imbalance by transferring at least one product from said richer flow to said poorer flow.

2. A process according to claim 1, comprising the operation of tipping the products of said advancing flow, which are set flat, in such a way as to set them on edge, said tipping action being performed in a given region before stacking, and wherein said at least one first engagement element and said at least one second engagement element are inserted in said flow of products being fed forwards in a position corresponding to said tipping region.

3. A process according to claim 1, comprising the operation of providing a conveyor device which acts in alignment with said stacking path and is provided with corresponding engagement elements ordered in pairs, each pair comprising a first engagement element and a second engagement element which are designed to engage, respectively, the last product and the first product in said slugs of products.

4. A process according to claim 3, comprising the operation of configuring the second engagement element of said pairs as an element that is able to co-operate with said products in a relationship of elastic compliance.

5. A process according to claim 3, comprising the operations of:

disengaging said at least one first engagement element from said first product when said first product is taken up by the second engagement element of a pair of engagement elements of said conveyor device; and disengaging said at least one second engagement element from said last product when said last product is taken up by the first engagement element of a pair of engagement elements of said conveyor device.

6. A process according to claim 1, comprising the operation of causing said products to advance along said stacking path by means of a movable conveying structure, said movable conveying structure having an overall filiform configuration.

7. A process according to claim 1, wherein said given number of products is chosen as equal to two.

8. A process according to claim 7, wherein after said transfer of at least one product from said richer flow to said poorer flow, said first flow and said second flow are merged into a single flow.

9. A process according to claim 7, wherein at least one between said first flow and said second flow is obtained by merging together at least two of said input flows.

10. A device for forming, starting from a flow of advancing products, groups or slugs comprising a given number of products set on edge, each slug comprising, in the direction of advance, a first product and a last product, said device comprising:

at least one first engagement element which is able to follow the movement of advance of the products and to withhold the first product of said slug of products, preventing it from falling forwards in the direction of advance;

a stacking structure which is substantially horizontal and in which said advancing products pile up against said first product, forming said slug;

at least one second engagement element which is able to co-operate with the last product in said slug and to exert a thrust on said last product in said direction of advance in such a way as to separate it from the first product of a next slug being formed in said stacking structure;

conveying means for forming at least one first flow and one second flow of said products;

sensing means for monitoring the number of products comprised in said first flow and said second flow and for detecting the occurrence of situations of imbalance in which one of said flows is richer than the other by a given number of products; and transfer means which are able to intervene on said first flow and said second flow in the presence of said situations of imbalance in order to transfer at least one product from said richer flow to said poorer flow.

11. A device according to claim 10, comprising a tipping device which is able to receive said products set flat down to tip them up and set them on their edges, and wherein said at least one first engagement element and said at least one second engagement element are propelled by first and second drives, respectively, said first and second drives inserting said at least one first engagement element and said at least one second engagement element in said flow of advancing products in a position corresponding to said tipping device.

12. A device according to claim 10, comprising, in a position corresponding to said stacking structure, at least one conveying element for conveying said products (P) which has an overall filiform structure.

13. A device according to claim 10, further comprising an output conveyor in which said at least one first flow and said at least one second flow converge downstream of said transfer means.

14. A device according to claim 10, comprising a confluence device for causing a plurality of said input flows to converge into at least one between said first flow and said second flow.

15. A device according to claim 10, comprising, arranged downstream of said transfer means, a further conveyor which is able to act on said at least one first flow and said at least one second flow depending upon the accumulation, according to substantially identical modalities for said first flow and said second flow.

16. A device according to claim 10, for conveying products orderly arranged in input flows which may present discontinuities,
wherein said at least one first engagement element and said at least one second engagement element act downstream of said transfer means in the direction of advance of the products.

17. A device according to claim 10, wherein at least one first engagement element is associated to a motor-driven loop formation having an active branch that is co-extensive with said stacking structure.

18. A device according to claim 17, wherein said at least one first engagement element consists of a tooth which is mounted on said motor-driven loop formation and which is able to project towards the inside of the stacking structure so as to be able to act on the products that are found inside the structure itself.

19. A device according to claim 10, wherein said at least one second engagement element is associated to a motor-driven loop formation having an active branch that is co-extensive with said stacking structure.

20. A device according to claim 19, wherein said at least one second engagement element consists of a tooth which is mounted on said motor-driven loop formation and which is able to project towards the inside of the stacking structure so as to be able to act on the products that are found inside the structure itself.

21. A device according to claim 10, wherein said transfer means are configured in such a way as to intervene in the presence of a said given number of products equal to two.

22. A device according to claim 21, for conveying products orderly arranged in input flows which may present discontinuities and;
wherein said at least one first engagement element and said at least one second engagement element act downstream of said transfer means in the direction of advance of the products.

23. A device according to claim 10, comprising a conveyor acting in a position corresponding to said stacking structure and provided with respective engagement elements ordered in pairs, each pair comprising a first engagement element and a second engagement element designed to engage, respectively, the last product and the first product of said slug of products.

24. A device according to claim 23, wherein at least said second engagement element of said pairs is configured as an elastically compliant structure during co-operation with said products.

25. A device according to claim 23, comprising a control unit which controls movement of said at least one first engagement element, of said at least one second engagement element, and of said conveyor, selectively bringing about:
disengagement of said at least one first engagement element from said first product when said first product enters into a relationship of cooperation with the second engagement element of a pair of engagement elements associated to said conveyor; and
disengagement of said at least one second engagement element from said last product when said last product enters into a relationship of co-operation with the first engagement element of a pair of engagement elements associated to said conveyor.

26. A device according to claim 10, wherein said transfer means comprise:
a first conveyor and a second conveyor for conveying said products;
a first transfer unit that is able to transfer selectively said products from said first conveyor to said second conveyor; and
a second transfer unit that is able to transfer selectively said products from said second conveyor to said first conveyor.

27. A device according to claim 26, wherein:
said first conveyor and said second conveyor convey said products in a common direction; and
said first transfer unit and said second transfer unit act in respective directions that are generically oblique with respect to said common direction of conveyance of said first conveyor and said second conveyor.

28. A device according to claim 26, wherein said first transfer unit and said second transfer unit each have a respective end set upstream and a respective end set downstream, the former upstream end being located in a position corresponding to the conveyor starting from which selective transfer of said products is made by said transfer units, and the latter downstream end being located in a position corresponding to the conveyor towards which selective transfer of said products is made by said transfer units.

29. A device according to claim 26, wherein said first transfer unit and said second transfer unit comprise active elements which are able to act on said products, promoting their movement in a direction that is transverse with respect to said first conveyor and said second conveyor.

30. A device according to claim 26, wherein said first transfer unit and said second transfer unit comprise a motor-driven drawing structure provided with at least one engagement formation that is able to act on said products, promoting their transfer between said first conveyor and said second conveyor.

31. A device according to claim 26, further comprising a third conveyor set between said first conveyor and said second conveyor, said third conveyor being mobile in a concordant and synchronized way with said first conveyor and said second conveyor so as to define a transfer path of said products between said first conveyor and said second conveyor, said third conveyor being able to move together with said first conveyor and said second conveyor in the absence of relative movement with respect to the said conveyors.

32. A device according to claim 31, wherein said third conveyor comprises channel-like formations which are able to define channels for transfer of said products between said first conveyor and said second conveyor.

* * * * *